(12) United States Patent
Saito et al.

(10) Patent No.: US 6,863,845 B2
(45) Date of Patent: Mar. 8, 2005

(54) ORGANIC METAL COMPLEX, INFRARED-ABSORBING DYE AND INFRARED ABSORPTION FILTER CONTAINING IT, AND FILTER FOR PLASMA DISPLAY PANEL

(75) Inventors: Yasuyo Saito, Yokohama (JP); Yuji Ohgomori, Yokohama (JP); Tetsuro Murayama, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 537 days.

(21) Appl. No.: 10/046,108

(22) Filed: Jan. 14, 2002

(65) Prior Publication Data

US 2002/0125464 A1 Sep. 12, 2002

Related U.S. Application Data

(63) Continuation of application No. PCT/JP00/04761, filed on Jul. 14, 2000.

(30) Foreign Application Priority Data

Jul. 16, 1999 (JP) ............................................. 11-202674
Aug. 2, 1999 (JP) ............................................. 11-218454

(51) Int. Cl.[7] .............................................. F21V 9/04
(52) U.S. Cl. ...................................... 252/587; 359/359
(58) Field of Search .......................... 252/587; 359/350, 359/885; 430/616, 944

(56) References Cited

U.S. PATENT DOCUMENTS 4,730,902 A * 3/1988 Suzuki et al. ............... 359/350

(List continued on next page.)

FOREIGN PATENT DOCUMENTS

JP 63-112592 5/1988

(List continued on next page.)

OTHER PUBLICATIONS

T. Kawamoto et al, "Carbon–Carbon Bond Formtion in Helical Nickel (II) Complex, CIS–BIS [2-N-(Phenylmethylideneamine) Benzenethiolato] Nickel (II)", Chemistry Letters, 1992, No. 5, pp. 893–896.

(List continued on next page.)

*Primary Examiner*—Randy Gulakowski
*Assistant Examiner*—Timothy J. Kugel
(74) *Attorney, Agent, or Firm*—Oblon, Spivak, McClelland, Maier & Neustadt, P.C.

(57) ABSTRACT

An organic metal complex having the formula (I):

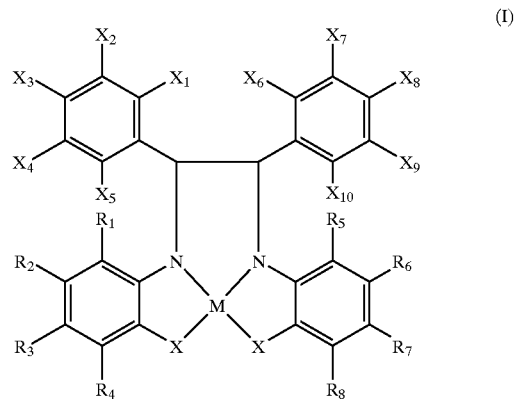

wherein X, M, $X_1-X_{10}$ and $R_1-R_8$ are as defined herein, having near infrared absorption with visible light transmittance.

28 Claims, 1 Drawing Sheet

U.S. PATENT DOCUMENTS

| | | | | |
|---|---|---|---|---|
| 4,913,846 A | * | 4/1990 | Suzuki et al. | 252/587 |
| 5,024,923 A | * | 6/1991 | Suzuki et al. | 430/372 |
| 5,132,938 A | * | 7/1992 | Walters | 367/38 |
| 5,436,113 A | * | 7/1995 | Tsuji et al. | 430/270.19 |
| 5,788,914 A | * | 8/1998 | Oi et al. | 252/587 |
| 5,804,102 A | | 9/1998 | Oi et al. | |
| 6,217,796 B1 | * | 4/2001 | Hasegawa et al. | 252/587 |
| 6,309,564 B1 | * | 10/2001 | Harada et al. | 252/587 |
| 6,391,535 B1 | * | 5/2002 | Arimoto et al. | 430/619 |
| 6,544,720 B2 | * | 4/2003 | Takasaki et al. | 430/281.1 |
| 2002/0014819 A1 | * | 2/2002 | Ozawa et al. | 313/112 |

FOREIGN PATENT DOCUMENTS

| | | |
|---|---|---|
| JP | 2-4881 | 1/1990 |
| JP | 4-174402 | 6/1992 |
| JP | 6-38124 | 5/1994 |

OTHER PUBLICATIONS

T. Kawamoto et al, "Valence Isomerization. Synthesis and Characterization of Cobalt and Nickel Complexes with Non–Innocent N2S2 Ligand", Bull. Chem. Soc. JPN., 1997, vol. 70, No. 7, pp. 1599–1606.

* cited by examiner (Solid line: Example 8,

Dashed line: Comparative Example 3)

ORGANIC METAL COMPLEX, INFRARED-ABSORBING DYE AND INFRARED ABSORPTION FILTER CONTAINING IT, AND FILTER FOR PLASMA DISPLAY PANEL

This application is a continuation of International No. PCT/JP00/04761, filed on Jul. 14, 2000.

BACKGROUND OF THE INVENTION

1. Field of the Invention

The present invention relates to an organic metal complex having absorption in an infrared region and an infrared-absorbing dye containing the same. Specifically, it relates to an infrared-absorbing dye material which can be used as e.g., a dye for an infrared absorption filter, a dye for heat ray shielding, a dye for a light shielding film, a dye for an optical recording material, a dye for data coding, a dye for a laser printer, a singlet oxygen quencher or a color fading preventive agent. Further, it relates to an infrared absorption filter containing such a dye, which is excellent in the near infrared absorption performance, heat ray absorption performance, visible light transmission and light resistance and thus useful as a filter to shield infrared rays, specifically an infrared absorption filter which is useful as a filter for an image display device or a heat ray absorption filter, such as a filter for a plasma display panel or an infrared filter for a digital camera.

2. Description of the Background

Generally, a near infrared absorption filter containing a near infrared-absorbing dye, is well known, and as applications therefor, sunglasses, glasses for welding, windows of buildings, automobiles, trains or airplanes, or an optical reader for reading out information, may, for example, be mentioned.

Recently, a filter containing an infrared-absorbing dye capable of absorbing near infrared rays, has become in demand also as a filter for a plasma display panel (hereinafter referred to as "PDP"), since PDP which has attracted an attention as a large sized thin type wall-hung TV, generates near infrared rays, which in turn affect nearby electronic equipments such as cordless phones or video players employing near infrared ray remote control systems to create malfunctions.

To meet such a demand, JP-B-2-4881 proposes an optical filter made of a thermoplastic resin having a benzene dithiol type metal complex incorporated. Further, JP-B-6-38124 proposes a near infrared absorption film or plate containing at least one member among an anthraquinone compound and a naphthalocyanine type compound having a metal atom coordinated at the center. JP-A-4-174402 proposes an infrared absorption filter obtained by further polymerizing a curing a synthetic resin composition containing an aluminum compound. Further, in recent years, as a filter for plasma display, JP-A-9-230134 proposes a filter for plasma display containing a dithiol type metal complex, and JP-A-10-78509 proposes a filter for plasma display containing a phthalocyanine dye.

Further, JP-A-63-112592 discloses an aminothiophenolate type metal complex dye, and as its application, a dye for an infrared absorption filter is mentioned. However, such a dye is inferior in the light resistance and has a problem with respect to the visible light transmittance, and thus it is not practically adequate.

Further, in recent years, as an aminothiophenolate type metal complex, a metal complex having a ligand of a type wherein N atom and N atom are connected via carbon, has been reported by Kushi et al, Bull. Chem. Soc. Jpn., 70(7) (1997)1599–1606. Such a dye shows intense absorption in a near infrared region, but in the UV-Vis spectrum in a solution, it is in equilibrium with a precursor showing absorption in a visible region, thus showing absorption in both the near infrared region and the visible region, whereby there is a problem that when it is processed into a product by using a solvent, it has absorption in the visible region, and the transmittance in the visible region decreases.

SUMMARY OF THE INVENTION

It is an object of the present invention to provide an infrared-absorbing dye material which has large absorption in a near infrared region, is chemically stable and excellent in the near infrared absorption performance, heat ray absorption performance, visible light transmittance, light resistance and heat resistance and has a good film-forming property, and a filter containing the same.

It is, in particular, an object of the present invention to provide an organic metal complex of the formula (I):

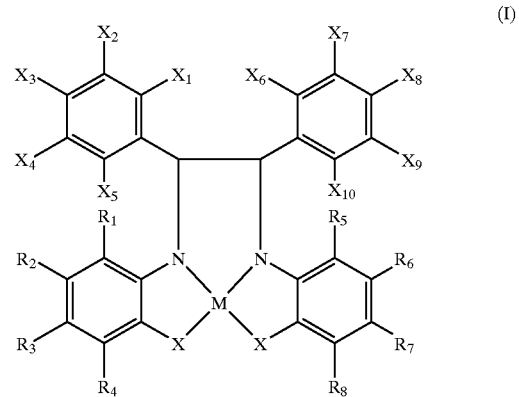

wherein X, M, $R_1$–$R_8$ and $X_1$–$X_{10}$ are as defined herein below.

BRIEF DESCRIPTION OF THE DRAWING

The drawing shows the near infrared absorptions in the films obtained in Example 8 and Comparative Example 3, respectively.

DETAILED DESCRIPTION OF THE PREFERRED EMBODIMENTS

Figure 1:
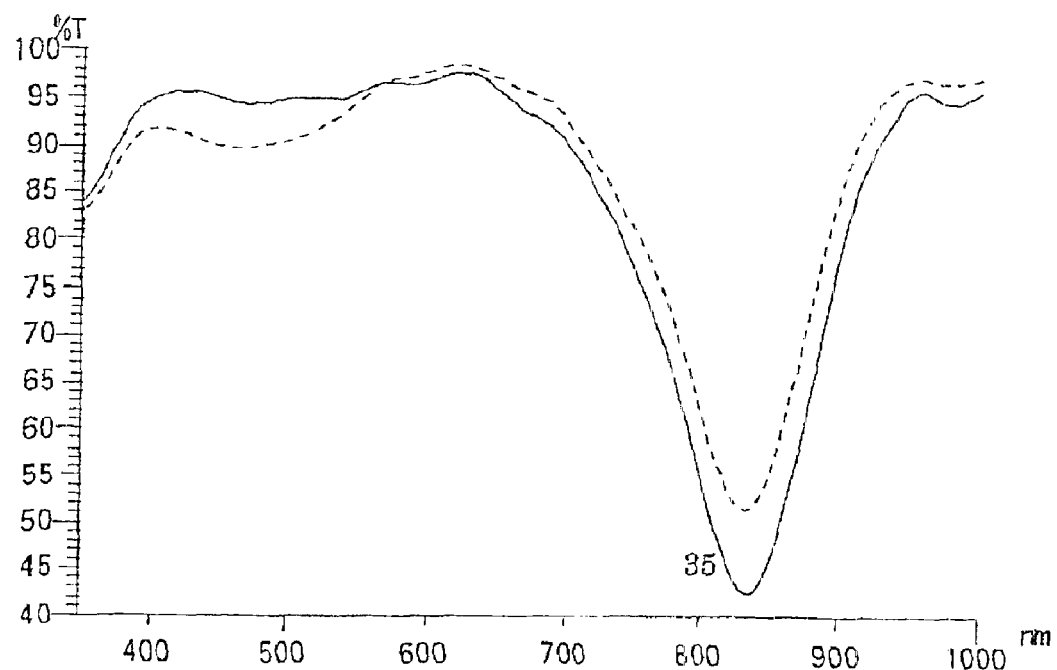

In accordance with the present invention, it has been found that in a metal complex of e.g., an aminothiophenolate type, nitrogen atoms coordinated to a metal are connected by a carbon chain to eliminate N—H moieties which cause deterioration in light resistance, thereby securing stabilization to improve light resistance, and an electron attractive substituent is introduced into the benzene ring, so that returning to a precursor which has absorption in a visible region even in a solvent, can be minimized, whereby it is possible to provide an infrared-absorbing dye excellent in the near infrared absorption performance, heat ray absorption performance, visible light transmittance, light resistance and heat resistance, and a filter containing it, and thus, the present invention has been accomplished.

Namely, the present invention provides an organic metal complex represented by the following formula (I):

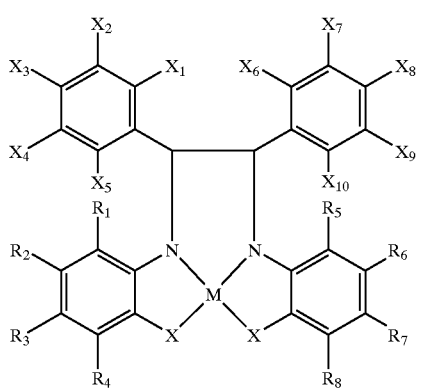

wherein X represents S or Se, M represents a metal element, $R_1$ to $R_8$ each independently represents a hydrogen atom, an alkyl group which may have a substituent, an aryl group which may have a substituent, an aralkyl group which may have a substituent, an alkoxy group which may have a substituent, an aryloxy group, a nitro group, a halogen atom, an amino group, a substituted amino group or a cyano group, $X_1$ to $X_{10}$ each independently represents a hydrogen atom, a halogen atom, a hydroxyl group, an alkoxy group, an aryloxy group, a nitro group, a cyano group, an alkyl group which may be substituted, an aryl group which may have a substituent, or an aralkyl group which may have a substituent, provided that at least one of $X_1$ to $X_{10}$ is not a hydrogen atom; and an infrared-absorbing dye containing the same.

The present invention will now be described in more detail.

In the present specification, Me represents a methyl group, Et an ethyl group, Bu a butyl group, Pr a propyl group, Hex a hexyl group, and Ph a phenyl group, and i-represents iso,—a strait chain, t-tertiary, and c-cyclo (cyclic).

In the following general formula (I):

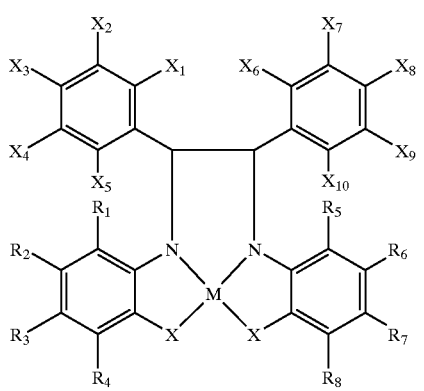

X represents S or Se, preferably S, M represents a metal atom, and a bivalent or trivalent transition metal is suitably employed. Preferably, Ni, Pd, Pt, Co, Fe, Ti, Sn or Cu, more preferably Ni, Pd, Pt or Co, is employed, and most preferred is a case where it is Ni. Particularly preferred is a case where X is S, and M is Ni, whereby the performance is excellent, and such is also economically advantageous.

$R_1$ to $R_8$ each independently represents a hydrogen atom, an alkyl group which may have a substituent, an aryl group which may have a substituent, an aralkyl group which may have a substituent, an alkoxy group which may have a substituent, an aryloxy group, a nitro group, a halogen atom, an amino group, a substituted amino group or a cyano group, preferably a hydrogen atom, an alkyl group, an aryl group, an aralkyl group, an alkoxy group, an aryloxy group, a nitro group, a halogen atom, an amino group, a substituted amino group or a cyan group, more preferably a hydrogen atom; a $C_{1-5}$ alkyl group such as a methyl group, an ethyl group, an i-butyl group, a t-butyl group, a n-butyl group or a n-pentyl group; an aryl group; an aralkyl group such as a benzyl group or a phenethyl group; a $C_{1-5}$ alkoxy group such as a methoxy group, an ethoxy group, a t-butoxy group or a n-butoxy group; a $C_{6-10}$ aryloxy group such as a phenoxy group or a methylphenoxy group; a nitro group; a halogen atom such as a chlorine atom, a bromine atom or a fluorine atom; an amino group; a substituted amino group such as a dimethylamino group, a diethylamino group or a diphenylamino group; or a cyano group. Particularly preferred is a case where all of $R_1$ to $R_8$ are hydrogen atoms.

$X_1$ to $X_{10}$ each independently represents a hydrogen atom, a halogen atom, a hydroxyl group, an alkoxy group, a nitro group, a cyano group, an alkyl group which may be substituted, an aryl group which may have a substituent, or an aralkyl group which may have a substituent. Specifically, each may be a hydrogen atom, a fluorine atom, a chlorine atom, a bromine atom, a hydroxyl group, a $C_{1-5}$ alkoxy group such as a methoxy group, an ethoxy group, a t-butoxy group or a n-butoxy group, a $C_{6-10}$ aryloxy group such as a phenoxy group or a methylphenoxy group, a nitro group, a cyano group, a $C_{1-5}$ alkoxy group such as a methyl group, an ethyl group, an i-butyl group, a t-butyl group, a n-butyl group or a n-pentyl group, a substituted alkyl group such as a trichloromethyl group or a trifluoromethyl group, an aryl group, or an aralkyl group such as a benzyl group or a phenethyl group, preferably a hydrogen atom and an electron attractive group such as a fluorine atom, a chlorine atom, a bromine atom, a hydroxyl group, a $C_{1-5}$ alkoxy group such as a methoxy group, an ethoxy group, a t-butoxy group or a n-butoxy group, a trichloromethyl group, a trifluoromethyl group, a phenoxy group, a methylphenoxy group, a nitro group or a cyano group, provided that at least one of $X_1$ to $X_{10}$ is not a hydrogen atom. More preferably, at least one of $X_1$ to $X_{10}$ is a fluorine atom, a chlorine atom or a cyano group, the rest being a hydrogen atom. From the viewpoint of the stability as a dye and easy synthesis, particularly preferred is a case where the organic metal complex represented by the general formula (I) is symmetrical. It is preferred that from 1 to 3, more preferably 1 or 2, among $X_1$ to $X_5$ and $X_6$ to $X_{10}$, are fluorine atoms, chlorine atoms or cyano groups, the rest being a hydrogen atom.

For example, the following compounds may suitably be employed as the organic metal complex represented by the general formula (I) to be used in the present invention.

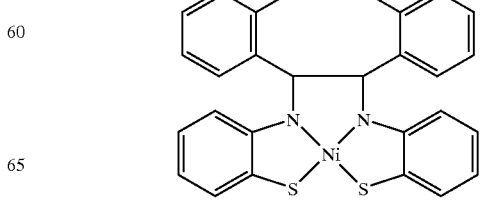

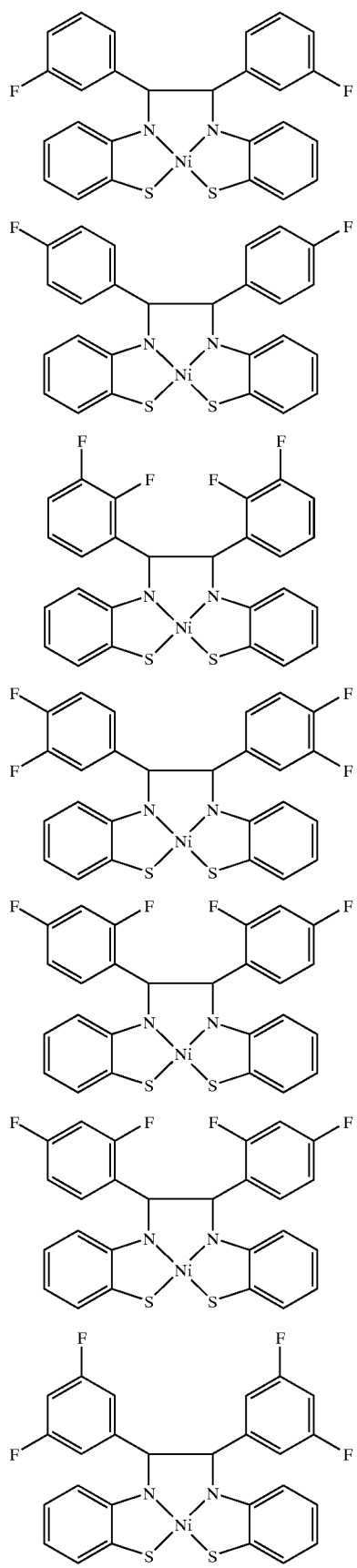
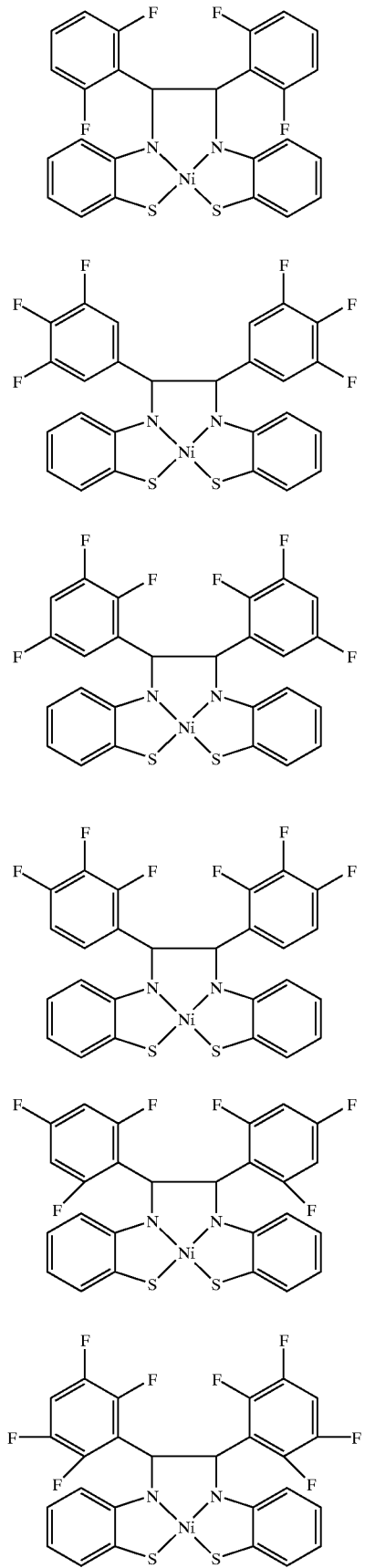

-continued
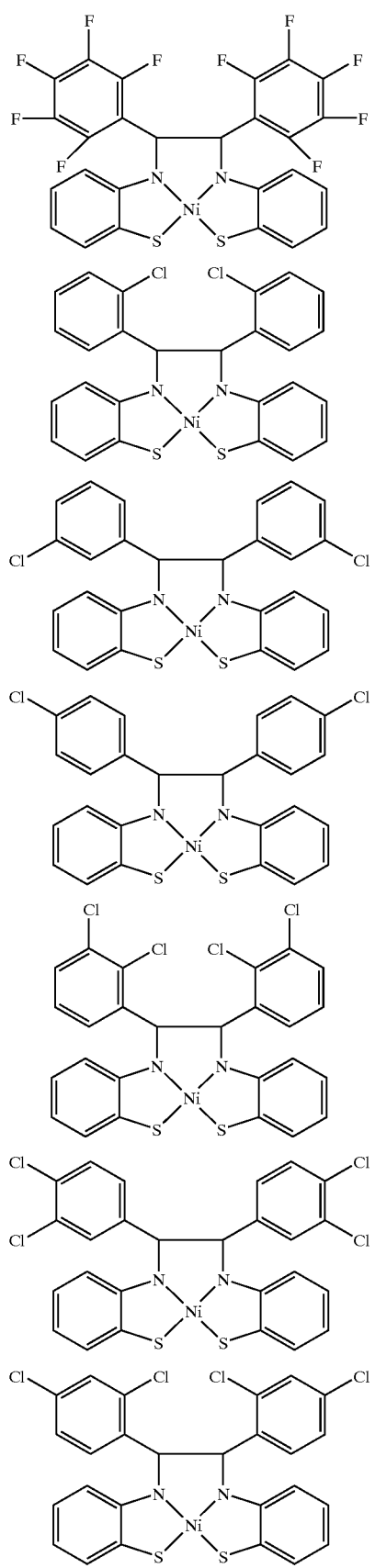
-continued
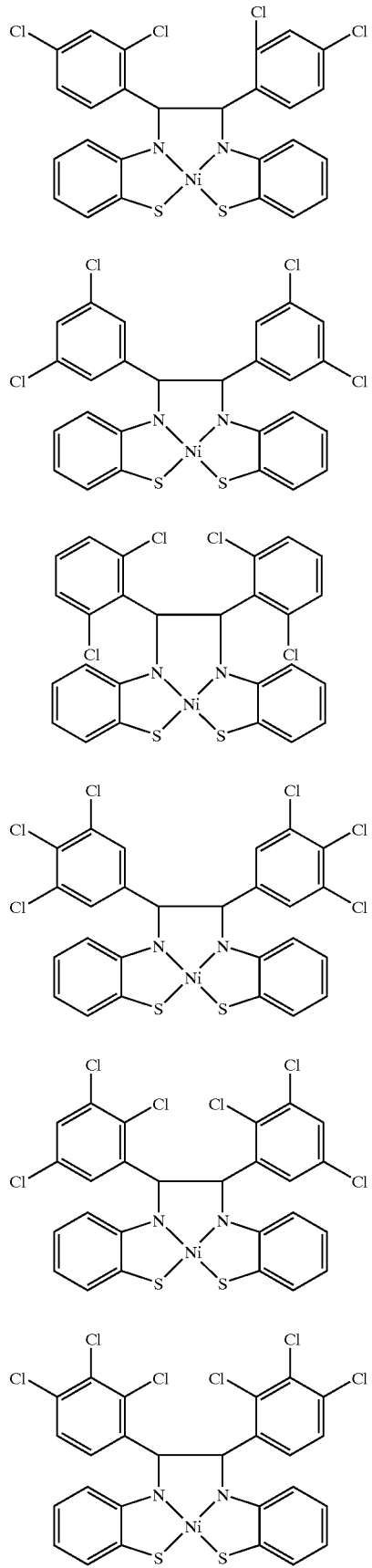

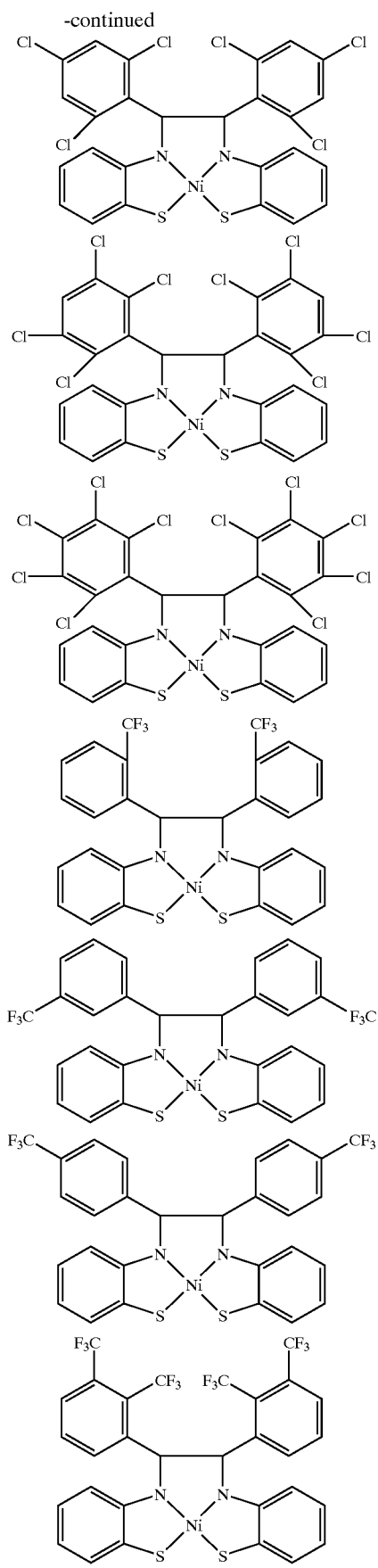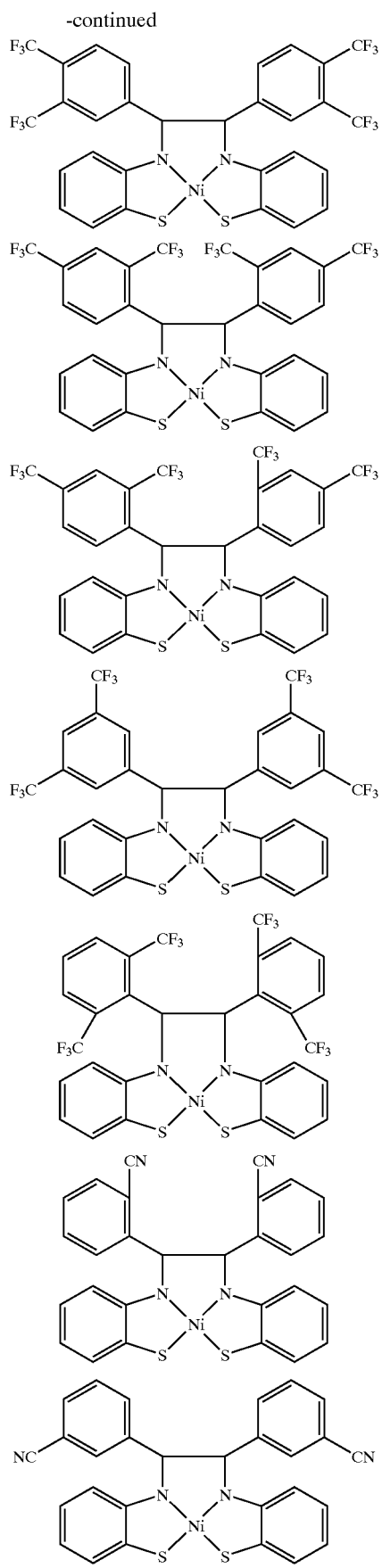

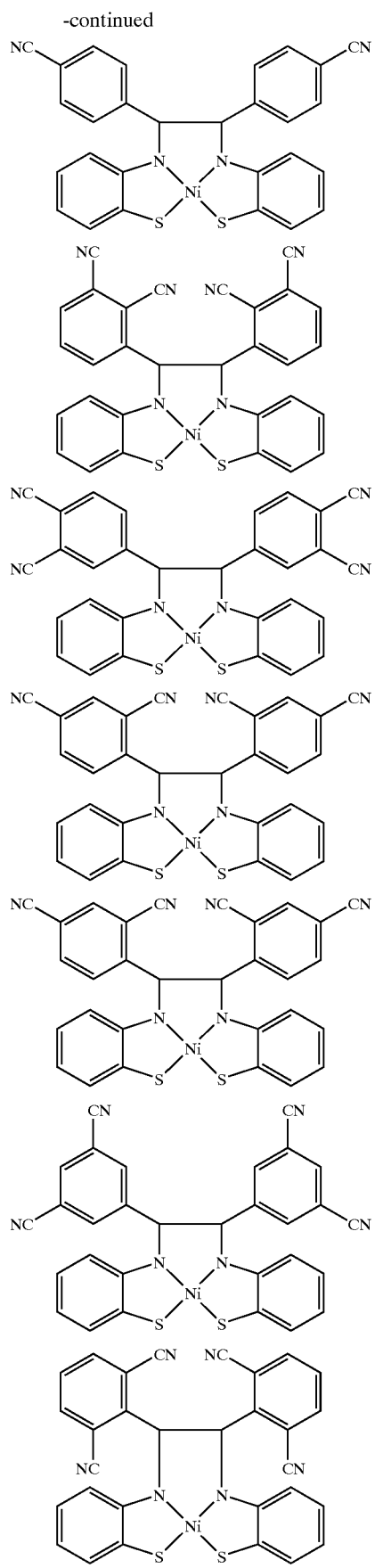
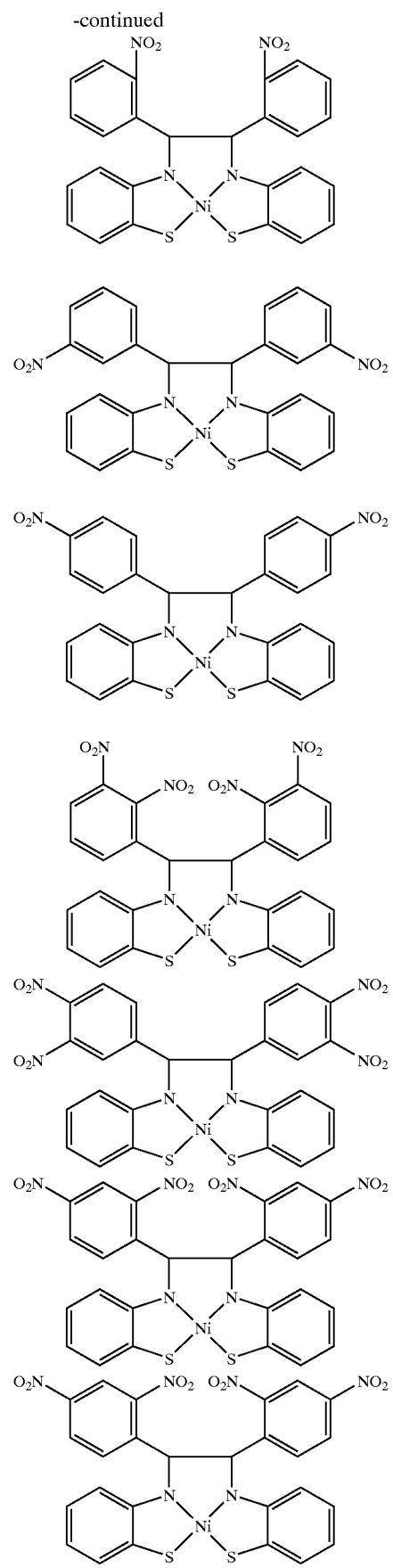

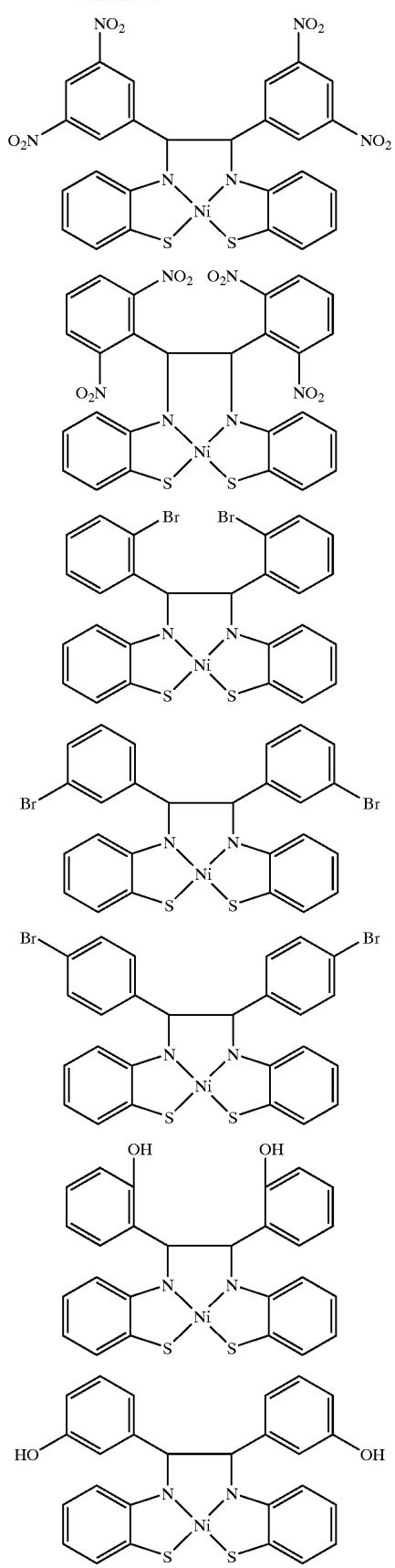
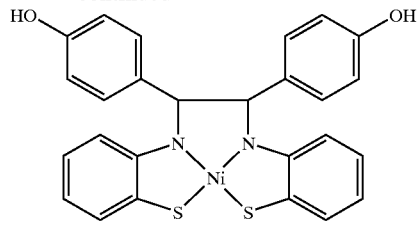
For example, when X is S, the organic metal complex to be used in the present invention can be produced as follows.
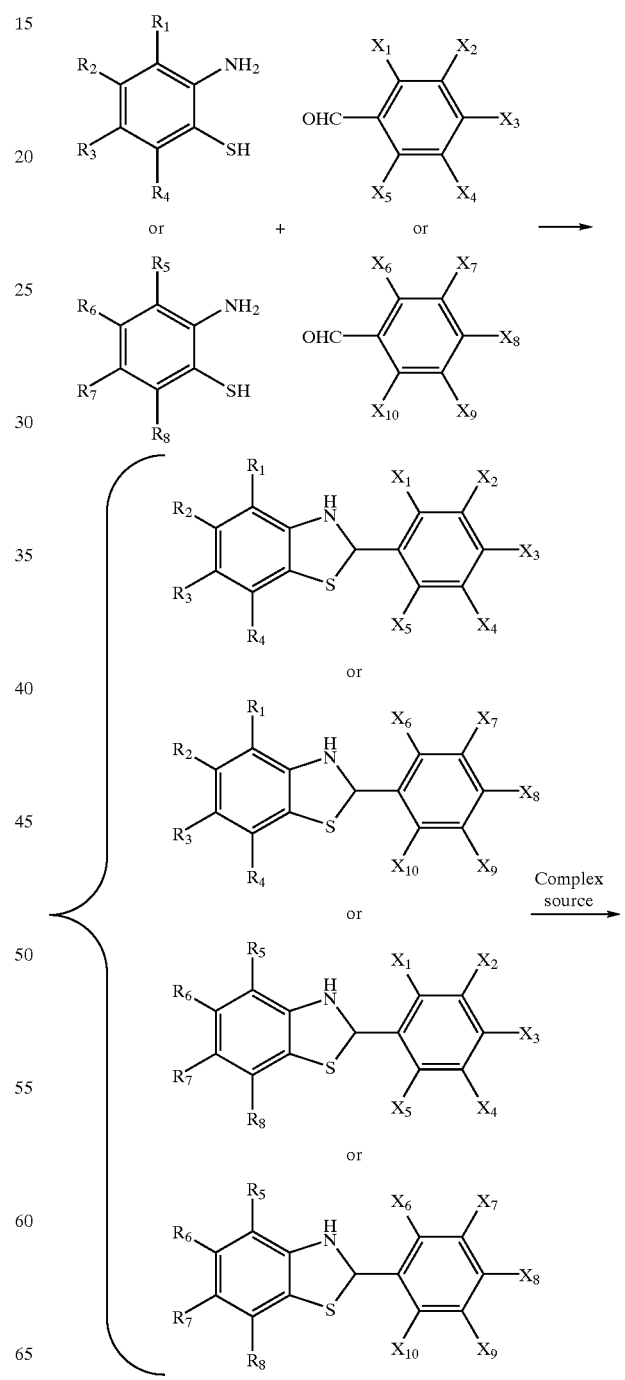

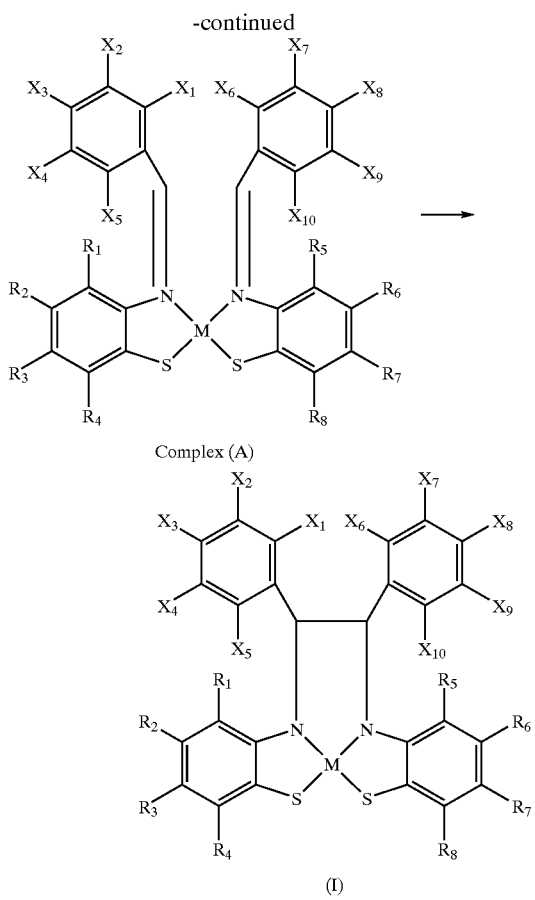

Namely, to a o-aminobenzenethiol, a benzylaldehyde is reacted to synthesize a benzothiazoline, to which a complex source is reacted to synthesize a complex (A). Thereafter, the complex (A) is heated in a solvent, whereby a compound represented by the general formula (I) can easily be synthesized. (In the formulae, the definitions of $R_1$ to $R_8$ and $X_1$ to $X_{10}$ are the same as in the general formula (I)).

Specific examples of the complex source to be used in this reaction, include $NiCl_2$, $NiCl_2 \cdot 6H_2O$, $Ni(OCOCH_3)_2$, $Ni(OCOCH_3)_2 \cdot 4H_2O$, $NiSO_4$, $PdCl_2$, $PdSO_4$, $PtCl_4$, $Na_2PtCl_6 \cdot 6H_2O$, $K_2PtCl_6 \cdot 6H_2O$, $CoCl_2$, $Co(OCOCH_3)_2$, $Co(OCOCH_3)_2 \cdot 4H_2O$, $CoSO_4$, $FeCl_3$, $FeSO_4$, $Fe_2(SO_4)_3$, $TiCl_3$, $TiCl_4$, $Ti(SO_4)_2$, $Sn(OCOCH_3)_2$, $Sn(OCOCH_3)_4$, $Sn(OMe)_4$, $Sn(OEt)_4$, $SnCl_2$, $SnCl_2 \cdot 2H_2O$, $SnCl_4$, $SnSO_4$, $Ti(OMe)_4$, $Ti(OEt)_4$, $CuCl_2$, $Cu(OCOCH_3)_2$, $CuSO_4$ and $CuSO_4 \cdot 4H_2O$.

The above reactions are usually carried out in a solvent. As the solvent, an ether such as tetrahydrofuran (hereinafter referred to as "THF"), diethylene glycol dimethyl ether, triethylene glycol dimethyl ether or tetraethylene glycol dimethyl ether, an alcohol such as methanol, ethanol, propanol, butanol, pentanol, hexanol, cyclohexanol or octanol, a halogenated aliphatic hydrocarbon such as 1,2,3-trichloropropane, tetrachloroethylene, 1,1,2,2-tetrachloroethane or 1,2-dichloroethane, an aliphatic hydrocarbon such as cyclohexane, hexane or octane, an aromatic hydrocarbon such as benzene, toluene, xylene, mesitylene, monochlorobenzene, dichlorobenzene, nitrobenzene or squalane, an amide such as N,N-dimetylformanide or N,N,N',N'-tetramethylurea, a ketone such as acetone, methyl ethyl ketone or methyl isobutyl ketone, a sulfoxide such as dimethyl sulfoxide or sulfolane, a nitrile such as acetonitrile, propanenitrile or benzonitrile, or an ester such as ethyl acetate, methyl propionate, methyl enanthate, methyl linolate or methyl stearate, may, for example, be employed. Among these solvents, an ether type solvent or an alcohol type solvent is preferred. Further, the reaction can smoothly be carried out at room temperature or at a temperature of from 0° C. to 150° C.

The metal complex of the present invention thus obtained, shows intense absorption in a near infrared region and usually shows a blue color.

As a method for producing an infrared absorption filter of the present invention, a method of coating a coating solution containing the metal complex on a transparent substrate or a method of employing, as a transparent substrate, a film or the like having the metal complex incorporated, may, for example, be mentioned.

Now, a method for producing an infrared absorption filter by coating a coating solution containing the metal complex on a transparent substrate, will be described.

As the transparent substrate constituting the infrared absorption filter of the present invention, any substrate may be employed without any particular restriction so long as it is a substrate which is substantially transparent and has no substantial scattering or absorption. Specific examples thereof include glass, a polyolefin resin, an amorphous polyolefin resin, a polyester resin, a polycarbonate resin, a poly(meth)acrylate resin, a polystyrene, a polyvinyl chloride, a polyvinyl acetate, a polyarylate resin and a polyether sulfone resin. Among them, particularly preferred is an amorphous polyolefin resin, a polyester resin, a polycarbonate resin, a poly(meth)acrylate resin, a polyarylate resin or a polyether sulfone resin.

To such a resin, a known additive such as an antioxidant of phenol type or phosphorus type, a flame retardant of halogen type or phosphorus type, a heat resistant aging preventive agent, an ultraviolet absorber, a lubricant or an antistatic agent, may be incorporated.

For a transparent substrate, such a resin is formed into a film by a method such as injection molding, T-die molding, calender molding or compression molding, or by a method of dissolving it in an organic solvent, followed by casting. The resin formed into a film may be stretched or non-stretched. Further, it may be a laminate of films made of different materials.

The thickness of the transparent substrate is selected usually within a range of from 10 μm to 5 mm depending upon the particular purpose.

Further, to the transparent substrate, surface treatment by a conventional method, such as corona discharge treatment, flame treatment, plasma treatment, glow discharge treatment, surface roughening treatment or chemical treatment, or coating of e.g. an anchor coat agent or a primer, may be applied.

A coating solution containing the metal complex can be prepared by dissolving the metal complex in a solvent together with a binder resin. The concentration of the total solid content such as the metal complex and the binder resin to be dissolved in the solvent, is usually from 5 to 50 wt %. Further, the concentration of the metal complex to the total solid content is usually from 0.1 to 80 wt %, preferably from 0.1 to 50 wt %.

Further, the metal complex may be made into fine particles having a particle size of usually from 0.1 to 3 μm, if necessary, by means of a dispersing agent, and dispersed in a solvent together with a binder resin to prepare a coating solution. The concentration of solid contents such as the metal complex compound, the dispersing agent and the binder resin, dispersed in the solvent, is from 5 to 50 wt %. Further, the concentration of the metal complex to the total solid content is usually from 1 to 80 wt %, preferably from 5 to 70 wt %. The dispersing agent to be used may, for example, be a polyvinylbutyral resin, a phenoxy resin, a rosin-modified phenol resin, a petroleum resin, a hardened rosin, a rosin ester, rosin maleate or a polyurethane resin. Its amount is usually from 0 to 100 wt %, preferably from 0 to 70 wt %, to the metal complex.

The binder resin may, for example, be a polymethylmethacrylate resin, a polyethylacrylate resin, a polycarbonate resin, an ethylene/vinyl alcohol copolymer resin, or a polyester resin. However, from the viewpoint of the coating property or the light resistance as a filter for a plasma display panel, a polymethylmethacrylate resin, a polyester resin or polycarbonate resin is, for example, preferred. Among them, a polycarbonate resin is preferred, and a resin having a glass transition point (Tg) of at least 160° C. and a viscosity average molecular weight (Mv) of from 10,000 to 90,000, is preferred. As such a polycarbonate resin, it is particularly preferred to employ a polycarbonate resin having the following constituting unit:

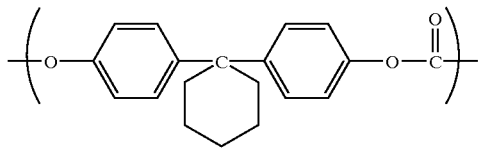

The amount of the binder resin to be used, is such that the metal complex will be from 0.01 to 50 wt %, preferably from 0.1 to 10 wt %, to the binder resin.

As the solvent for the coating solution, a halogenated aliphatic hydrocarbon such as 1,2,3-trichloropropane, tetrachloroethylene, 1,1,2,2-tetrachloroethane or 1,2-dichloroethane, an alcohol such as methanol, ethanol, propanol, butanol, pentanol, hexanol, cyclohexanol or octanol, a ketone such as acetone, methyl ethyl ketone or methyl isobutyl ketone, an ester such as ethyl acetate, methyl propionate, methyl enanthate, methyl linolate or methyl stearate, an aliphatic hydrocarbon such as cyclohexane, hexane or octane, an aromatic hydrocarbon such as benzene, toluene, xylene, mesitylene, monochlorobenzene, dichlorobenzene, nitrobenzene or squalane, a sulfoxide such as dimethyl sulfoxide or sulfolane, an amide such as N,N-dimetylformanide or N,N,N',N'-tetramethylurea, an ether such as tetrahydrofuran (hereinafter referred to as "THF"), dimethoxyethane (DME), dioxane, diethylene glycol dimethyl ether, triethylene glycol dimethyl ether or tetraethylene glycol dimethyl ether, or a mixture thereof, may be employed.

Further, to the coating solution containing the metal complex, another near infrared-absorbing agent may further be added. Another infrared-absorbing agent may, for example, be, as an organic material, a nitroso compound and its metal complex, a cyanine type compound, a squarylium compound, a thiol nickel complex salt type compound, a phthalocyanine compound, a naphthalocyanine compound, a triallylmethane type compound, an immonium type compound, a diimmonium compound, a naphthoquinone type compound, an anthraquinone type compound, an amino compound, an aluminum salt type compound, or, as an inorganic material, carbon black, indium tin oxide, antimony tin oxide, or an oxide, carbonate or boride of a metal belonging to Group A, 5A or 6A of the periodic table.

Thus, it is preferred to prepare an infrared absorption filter so that the near infrared transmittance in a wavelength region of from 800 to 1,100 nm would be at most 15% by using another near infrared-absorbing agent in combination, if necessary, in addition to the metal complex of the present invention. It is particularly preferred to employ the metal complex of the present invention and a diimmonium type compound in combination, from the viewpoint of the transparency and the infrared absorption performance. In this case, there is a possibility that the performance deteriorates due to the interaction, and it is better to incorporate the compound in a layer separate from the metal complex of the present invention.

Coating of the coating solution containing the metal complex on the transparent substrate is carried out by a conventional coating method such as a dipping method, a flow coating method, a spraying method, a bar coating method, a gravure coating method, a roll coating method, a blade coating method or an air knife coating method.

The layer containing the metal complex is coated so that the film thickness after drying would be usually from 0.1 to 30 μm, preferably from 0.5 to 10 μm.

With the infrared absorption filter of the present invention, by further providing an ultraviolet screening layer, the light resistance of the ultraviolet absorption filter can remarkably be improved by the synergistic effect with the metal complex. The ultraviolet screening layer is preferably one which is capable of efficiently screening ultraviolet rays having wavelengths of at most 400 nm. The type of the ultraviolet screening layer is not particularly limited. However, it is preferably a resin film (an ultraviolet screening film) containing an ultraviolet absorber.

As the ultraviolet absorber to be used for the ultraviolet screening layer, an organic type or an inorganic type may be used without any particular restriction, so long as it is a compound having the maximum absorption within a range of from 300 to 400 nm and being capable of efficiently screening light within the region. For example, as an organic ultraviolet ray absorber, a benzotriazole type ultraviolet absorber, a benzophenone type ultraviolet absorber, a salicylate type ultraviolet absorber, a triazine type ultraviolet absorber, a p-amino benzoic acid type ultraviolet absorber, a cinnamic acid type ultraviolet absorber, an acrylate type ultraviolet absorber or a hindered amine type ultraviolet absorber, may, for example, be mentioned. As an inorganic ultraviolet absorber, a titanium oxide type ultraviolet absorber, a zinc oxide type ultraviolet absorber or a fine particulate iron oxide type ultraviolet absorber, may, for example, be mentioned. In the case of the inorganic ultraviolet absorber, it is present in fine particulate state in the ultraviolet screening layer, whereby the efficiency of the infrared absorption filter may be impaired. Accordingly, an organic type ultraviolet absorber is preferred.

Such an ultraviolet absorber may, for example, be TINUBINE P, TINUBINE 120, 213, 234, 320, 326, 327, 328, 329, 384, 400 or 571, manufactured by Ciba-Geigy Company, SUMISORB 250, 300 or 577, manufactured by Sumitomo Chemical Co., Ltd., BIOSORB 582, 550 or 591, manufactured by Kyodo Chemical Co., Ltd., JF-86, 79, 78 or 80, manufactured by Johoku Chemical Co., Ltd., ADECASTSAB LA-32, LA-36 or LA-34, manufactured by Asahi Denka Kogyo K.K., SEASORB 100, 101, 110S, 102, 103, 501, 201, 202 or 162NH, manufactured by Shipro Kasei Kaisha, Ltd., RUVA 93, 30M or 30S, manufactured by Otsuka Chemical Co., Ltd., or Yubinal 3039, manufactured by BASF.

These ultraviolet absorbers may be used alone or in combination of two or more of them.

Further, a fluorescent whitening agent such as UBITEX OB or OB-P manufactured by Ciba-Geigy Company, may also be utilized, which absorbs ultraviolet rays to change the wavelength to a visible region.

The resin film (the ultraviolet screening film) containing an ultraviolet absorber can be prepared by adding the above-mentioned ultraviolet absorber to a base resin such as a polyethylene resin, a polypropylene resin, a polyvinyl chloride resin, a polystyrene resin, a polymethacrylate resin, a polyacrylate resin, a polyvinyl butyral resin, a polycarbonate resin, an ethylene/vinyl alcohol copolymer resin, an ethylene/vinyl acetate copolymer resin, a polyester resin, a melamine resin or a polyurethane resin. For the preparation of the ultraviolet screening film, a common method may be employed, such as melting/extruding, melting/extruding/stretching, casting, calendering or coating. The thickness of the ultraviolet screening film is from about 2 $\mu$m to 1 mm. The amount of the ultraviolet absorber to be added, may vary depending upon the thickness of the resin, desired absorption intensity, etc., but it is usually from 10 ppm to 30% of the film.

Further, as the ultraviolet screening film, a commercially available UV-screening filter may be employed. For example, SC-38 or SC-39 of Fuji Film Co., Ltd., or ACRYPRENE of Mitsubishi Rayon Co., Ltd., may, for example, be mentioned. Both of the above-mentioned UV-screening filters SC-39 and ACRYPRENE are ultraviolet screening films which absorb at least 99% of a wavelength of 350 nm.

The infrared absorption filter of the present invention will be provided, as the case requires, with e.g. an electromagnetic wave screening layer, an anti-reflection layer to prevent reflection of an external light of e.g. a fluorescent lamp on the surface, an anti-glare layer (a non-glare layer) or an ultraviolet screening layer, so that it is useful as a filter for PDP.

The PDP filter is not particularly limited with respect to its construction, production, etc. However, for example, it may have a structure wherein the ultraviolet absorption filter of the present invention is bonded to a transparent resin substrate via an adhesive layer, and an anti-reflection layer or a non-glare layer is formed on each side thereof. Further, it may have an ultraviolet screening layer on the PDP side of the ultraviolet absorption filter. Furthermore, an electromagnetic wave screening layer may be provided between optional layers of the PDP filter. The layer structure of the PDP filter is not limited to such a structure, and the layer structure may suitably be changed within a range where the performance as the PDP filter can adequately be obtained, by omitting some layer or further adding another layer, as the case requires.

Further, in the case where in the infrared absorption filter, the metal complex of the present invention and another near infrared absorber are used in combination, they may be used in the same layer of the present invention, but they may be incorporated in separate layers, so that they are laminated as a plurality of layers in a case where there is a possibility of deterioration in performance such as light resistance due to the interaction thereof.

The electromagnetic wave screening layer is a layer provided to shield an electromagnetic wave emitted from PDP, and it preferably transmits at least 70% of visible light of from 400 to 700 nm and has a surface resistivity of at most 50 $\Omega/\square$. To provide the electromagnetic wave screening layer, a sputtering method or vapor deposition of e.g. a metal oxide may be employed. Usually, indium tin oxide (ITO) is common, but a dielectric layer and a metal layer may be alternately laminated on a substrate by e.g. sputtering, whereby light of at least 1,000 nm can be shielded. The dielectric layer may, for example, be a transparent metal oxide such as indium oxide, zinc oxide, antimony tin oxide or zinc aluminum oxide, and the metal layer may usually be silver or a silver/palladium alloy. Usually, about three layers, five layers, seven layers or 11 layers, may be laminated starting with a dielectric layer. As the substrate, the infrared absorption filter of the present invention may be used as it is, or an electromagnetic screening layer may be formed on a resin film or glass by vapor deposition or sputtering, and then it may be bonded to the infrared absorption filter of the present invention.

In order to suppress reflection at the surface and improve the transmittance of the filter, an anti-reflection layer may be formed by a method of laminating an inorganic substance such as a metal oxide, fluoride, silicide, boride, carbide, nitride or sulfide, in a single layer or multilayers, by e.g. a vacuum deposition method, a sputtering method, an ion plating method or an ion beam assisting method, or by a method of laminating a resin having a different refractive index, such as an acrylic resin or a fluororesin, in a single layer or multilayers. Otherwise, a film having anti-reflection treatment applied, may be bonded on the filter.

Further, a non-glare layer may be formed. In order to scatter the transmitted light for the purpose of widening the visual field angle of the filter, the non-glare layer may be formed by e.g. a method wherein a fine powder of e.g. silica, melamine or acryl is formed into an ink, which is coated on the surface. The curing of the ink may be carried out by thermal curing or hot curing. Otherwise, a non-glare treated film may be bonded to the filter. Still further, a hard coat layer may be formed, as the case requires.

Further, this infrared absorption filter may be used not only alone but also in the form of a laminate as bonded to a transparent glass or other transparent resin plate or the like.

The infrared absorption filter obtained by the present invention is useful particularly as a filter for PDP. Not only that, it is useful in a wide range of applications, such as a filter for display, a heat ray shielding film, sunglasses, protective glasses, or a light receptor for a remote control system.

The organic metal complex of the present invention is useful as various functional dyes. Specifically, it is useful, for example, as a dye for an infrared absorption filter, a dye for heat ray shielding, a dye for a light shielding film, a dye for an optical recording material, a dye for data coding, a dye for a laser printer, a singlet oxygen quencher or a color fading preventive agent.

The present invention will now be further described with reference to certain Examples, however these Examples are provided solely for purposes of illustration and are not intended to be limitative.

EXAMPLE 1

Synthesis of Complex No. 1

To about 100 ml of methanol, 22.7 ml (0.2 mol) of m-chlorobenzaldehyde was dissolved, and to the solution, 21.5 ml (0.20 mol) of o-aminobenzenethiol was added at room temperature with stirring, followed by refluxing for 0.5 hour. To the solution, 200 ml of methanol and 19.8 g (0.08 mol) of $Ni(AcO)_2 \cdot 4H_2O$ were further added, whereupon a brown solid precipitated. After refluxing for further one hour, filtration under reduced pressure and washing with methanol for a few times, were carried out. Then, the filtration product was vacuum-dried at 60° C. to obtain 42.7 g (0.77 mol, yield: 96.3%) of a brown complex represented by the following formula.

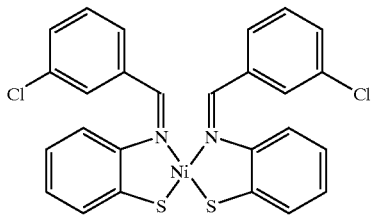

To 5.0 g of the above complex, 500 ml of tetrahydrofuran (hereinafter referred to as THF) was added, followed by refluxing until the reaction solution changed to a dark blue color (about one hour). Thereafter, the filtration product was removed by filtration under reduced pressure, and then, the filtrate was concentrated to crystallize the product. Thereafter, crystals were subjected to filtration under reduced pressure and vacuum-dried at 60° C. to obtain 4.85 g (yield: 97.0%) of complex No. 1 of the following structure.

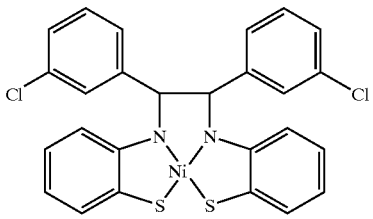

Structure Analyses (1) 1H-NMR (δ, ppm); 7.73 (d, 2H), 7.38 (S, 2H), 7.02–7.30 (m, 12H), 6.27 (s, 2H).

(2) IR(KBr: ν, cm$^{-1}$); 3047, 1569, 1516, 1421, 1311, 1144, 1050, 792, 794, 653, 601. (3) Elemental analysis ($C_{26}H_{18}Cl_2N_2NiS_2$); Measured value: C, 55.97; H, 3.10; N, 5.01; Cl, 12.10; Calculated value: C, 56.56; H, 3.29; N, 5.07; Cl, 12.84.

(4) Mass spectrum: m/z. 552 (the mass pattern agreed with the one simulated with $C_{26}H_{18}Cl_2N_2NiS_2$.)

This complex showed intense absorption of ∈=34,000 at 830 nm in a near infrared region, in THF.

EXAMPLE 2

Synthesis of Complex No. 2

In about 10 ml of ethanol, 3.50 g (0.02 mol) of 3,4-dichlorobenzaldehyde was dissolved, and to the solution, 2.1 ml (0.02 mol) of o-aminobenzenethiol was added at room temperature with stirring, followed by refluxing for 0.5 hour. To the solution, 20 ml of ethanol and 2.10 g (0.0085 mol) of Ni(AcO)$_2$.4H$_2$O were further added, whereupon a reddish brown solid precipitated. After refluxing for further one hour, filtration under reduced pressure and washing with ethanol for a few times, were carried out. Then, the filtration product was vacuum-dried at 60° C. to obtain 4.25 g (0.0068 mol, yield: 80.5%) of a brown complex represented by the following formula.

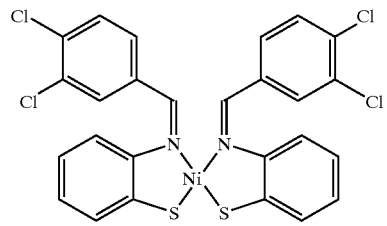

To 1.0 g of the above complex, 100 ml of THF was added, followed by refluxing until the reaction solution changed to a dark blue color. Thereafter, the filtration product was removed by filtration under reduced pressure, and then, the filtrate was concentrated to crystallize the product. Thereafter, crystals were subjected to filtration under reduced pressure and vacuum-dried at 60° C. to obtain 0.89 g (yield: 89.0%) of complex No. 2 of the following structure.

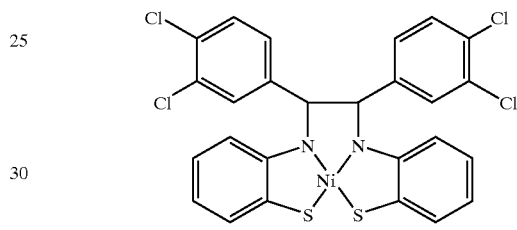

Structure Analyses (1) 1H-NMR (δ, ppm); 7.75 (d, 2H), 7.46 (S, 2H), 7.00–7.30 (m, 10H), 6.22 (s, 2H).

(2) IR(KBr: ν, cm$^{-1}$); 3047, 2882, 1571, 1518, 1465, 1314, 1244, 1143, 1049, 931, 819, 752, 714, 645, 597.

(3) Elemental analysis ($C_{26}H_{16}Cl_4N_2NiS_2$); Measured value: C, 50.75; H, 2.47; N, 4.41; Cl, 22.52; Calculated value: C, 50.29; H, 2.60; N, 4.51; Cl, 22.83.

(4) Mass spectrum: m/z. 620 (the mass pattern agreed with the one simulated with $C_{26}H_{16}Cl_4N_2NiS_2$.)

This complex showed intense absorption of ∈=33,000 at 830 nm in a near infrared region, in THF.

EXAMPLE 3

Synthesis of Complex No. 3

In about 10 ml of ethanol, 2.17 ml (0.02 mol) of 3,4-difluorobenzaldehyde was dissolved, and to the solution, 2.1 ml (0.02 mol) of o-aminobenzenethiol was added at room temperature with stirring, followed by refluxing for 0.5 hour. To the solution, 20 ml of ethanol and 2.10 g (0.0085 mol) of Ni(AcO)$_2$.4H$_2$O were further added, whereupon a reddish brown solid precipitated. After refluxing for further one hour, filtration under reduced pressure and washing with ethanol for a few times, were carried out. Then, the filtration product was vacuum-dried at 60° C. to obtain 4.25 g (0.0072 mol, yield: 85.2%) of a brown complex represented by the following formula.

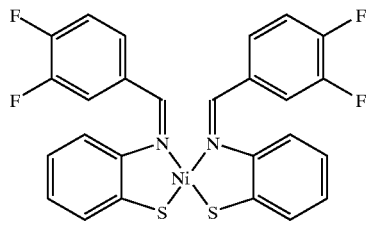

To 1.0 g of the above complex, 100 ml of THF was added, followed by refluxing until the reaction solution changed to a dark blue color. Thereafter, the filtration product was removed by filtration under reduced pressure, and then, the filtrate was concentrated to crystallize the product. Thereafter, crystals were subjected to filtration under reduced pressure and vacuum-dried at 60° C. to obtain 0.85 g (yield: 85.0%) of complex No. 3 of the following structure.

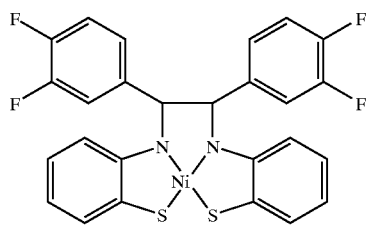

Structure Analyses (1) 1H-NMR (δ, ppm); 7.75 (d, 2H), 7.16–7.40 (m, 4H), 7.00–7.16 (m, 80H), 6.24 (s, 2H).

(2) 19F-NMR (δ, ppm); −136.5, −138.5.

(3) IR(KBr: ν, cm$^{-1}$); 3046, 1606, 1514, 1423, 1314, 1278, 1147, 1048, 754, 617.

(4) Elemental analysis ($C_{26}H_{16}F_4N_2NiS_2$); Measured value: C, 56.54; H, 2.59; N, 5.04; F, 13.73; Calculated value: C, 56.25; H, 2.90; N, 5.05; F, 13.69.

(5) Mass spectrum: m/z. 554 (the mass pattern agreed with the one simulated with $C_{26}H_{16}F_4N_2NiS_2$.)

This complex showed intense absorption of ∈=31,000 at 830 nm in a near infrared region, in THF.

EXAMPLE 4

Synthesis of Complex No. 4

In about 10 ml of ethanol, 3.50 ml (0.02 mol) of 2,3-dichlorobenzaldehyde was dissolved, and to the solution, 2.1 ml (0.02 mol) of o-aminobenzenethiol was added at room temperature with stirring, followed by refluxing for 0.5 hour. To the solution, 20 ml of ethanol and 2.10 g (0.0085 mol) of Ni(AcO)$_2$.4H$_2$O were further added, whereupon a brown solid precipitated. After refluxing for further one hour, filtration under reduced pressure and washing with ethanol for a few times, were carried out. Then, the filtration product was vacuum-dried at 60° C. to obtain 4.38 g (0.0071 mol, yield: 83.0%) of a brown complex represented by the following formula.

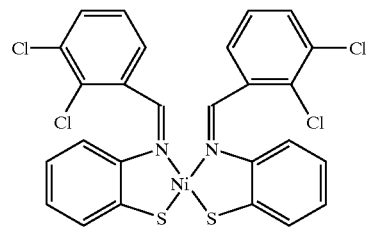

To 1.0 g of the above complex, 100 ml of THF was added, followed by refluxing until the reaction solution changed to a dark blue color. Thereafter, the filtration product was removed by filtration under reduced pressure, and then, the filtrate was concentrated to crystallize the product. Thereafter, crystals were subjected to filtration under reduced pressure and vacuum-dried at 60° C. to obtain 0.65 g (yield: 65.0%) of complex No. 4 of the following structure.

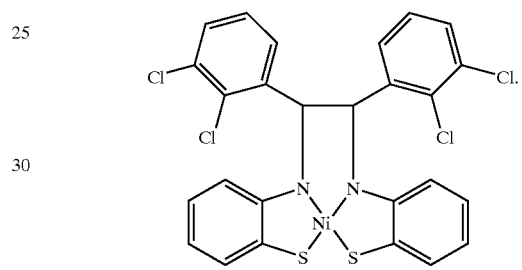

Structure Analyses (1) 1H-NMR (300 MHz, in CDCl3: δ, ppm); 7.72 (d, 2H), 7.38 (d, 2H), 7.05–7.30 (m, 6H), 7.04 (d, 2H), 6.89 (dd, 2H), 6.74 (s, 2H).

(2) IR(KBr: ν, cm$^{-1}$); 3071, 3047, 1566, 1520, 1417, 1315, 1243, 1159, 1143, 1072, 1046, 792, 744, 713, 654, 621, 572.

(3) Elemental analysis ($C_{26}H_{16}Cl_4N_2NiS_2$); Measured value: C, 50.78; H, 2.22; N, 4.49; Cl, 21.93; Calculated value: C, 50.29; H, 2.60; N, 4.51; Cl, 21.83.

(4) Mass spectrum: m/z. 620 (the mass pattern agreed with the one simulated with $C_{26}H_{16}Cl_4N_2NiS_2$.)

This complex showed intense absorption of ∈=32,500 at 830 nm in a near infrared region, in THF.

EXAMPLE 5

Synthesis of Complex No. 5

In about 10 ml of ethanol, 0.6650 g (0.005 mol) of 3-cyanobenzaldehyde was dissolved, and to the solution, 0.53 ml (0.005 mol) of o-aminobenzenethiol was added at room temperature with stirring, followed by refluxing for 0.5 hour. To the solution, 20 ml of ethanol and 0.52 g (0.0021 mol) of Ni(AcO)$_2$.4H$_2$O were further added, whereupon a brown solid precipitated. After refluxing for further one hour, filtration under reduced pressure and washing with ethanol for a few times, were carried out. Then, the filtration product was vacuum-dried at 60° C. to obtain 1.03 g (0.0019 mol, yield: 92.1%) of a dark brown complex represented by the following formula.

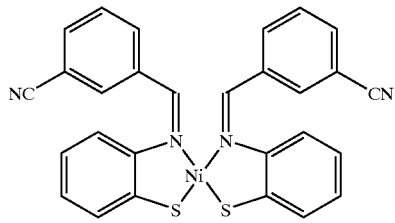

To 1.0 g of the above complex, 100 ml of THF was added, followed by refluxing until the reaction solution changed to a dark blue color. Thereafter, the filtration product was removed by filtration under reduced pressure, and then, the filtrate was concentrated to crystallize the product. Thereafter, crystals were subjected to filtration under reduced pressure and vacuum-dried at 60° C. to obtain 0.95 g (yield: 95.0%) of the following product. The mass spectrum was measured, whereby m/z. 532, and it was confirmed to be complex No. 5 represented by the following structure.

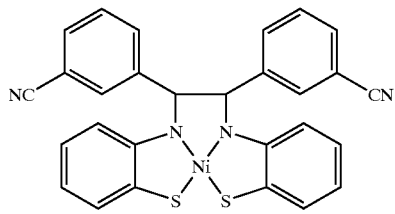

This complex showed intense absorption of $\in$=35,000 at 835 nm in a near infrared region, in THF.

EXAMPLE 6

Synthesis of Complex No. 6

In about 10 ml of ethanol, 0.75 g (0.005 mol) of 3-nitrobenzaldehyde was dissolved, and to the solution, 0.53 ml (0.005 mol) of o-aminobenzenethiol was added at room temperature with stirring, followed by refluxing for 0.5 hour. To the solution, 20 ml of ethanol and 0.52 g (0.0021 mol) of Ni(AcO)$_2$.4H$_2$O were further added, whereupon a brown solid precipitated. After refluxing for further one hour, filtration under reduced pressure and washing with ethanol for a few times, were carried out. Then, the filtration product was vacuum-dried at 60° C. to obtain 1.10 g (0.0019 mol, yield: 90.5%) of a dark brown complex represented by the following formula.

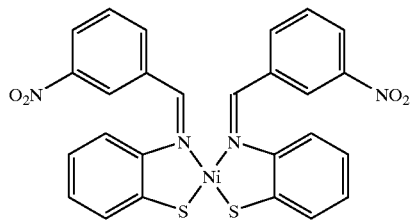

To 1.0 g of the above complex, 100 ml of THF was added, followed by refluxing until the reaction solution changed to a dark blue color. Thereafter, the filtration product was removed by filtration under reduced pressure, and then, the filtrate was concentrated to crystallize the product. Thereafter, crystals were subjected to filtration under reduced pressure and vacuum-dried at 60° C. to obtain 0.91 g (yield: 91.0%) of the following product. The mass spectrum was measured, whereby m/z. 572, and it was confirmed to be complex No. 6 represented by the following structure.

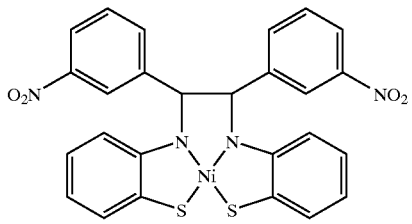

This complex showed intense absorption of $\in$=24,000 at 835 nm in a near infrared region, in THF.

EXAMPLE 7

Synthesis of Complex No. 7

In about 10 ml of ethanol, 0.87 g (0.005 mol) of 3-trifluorobenzaldehyde was dissolved, and to the solution, 0.53 ml (0.005 mol) of o-aminobenzenethiol was added at room temperature with stirring, followed by refluxing for 0.5 hour. To the solution, 20 ml of ethanol and 0.52 g (0.0021 mol) of Ni(AcO)$_2$.4H$_2$O were further added, whereupon a dark brown solid precipitated. After refluxing for further one hour, filtration under reduced pressure and washing with ethanol for a few times, were carried out. Then, the filtration product was vacuum-dried at 60° C. to obtain 1.11 g (0.0019 mol, yield: 86.7%) of a brown complex represented by the following formula.

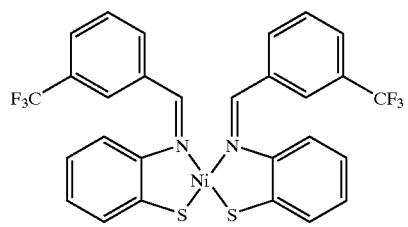

To 1.0 g of the above complex, 100 ml of THF was added, followed by refluxing until the reaction solution changed to a dark blue color. Thereafter, the filtration product was removed by filtration under reduced pressure, and then, the filtrate was concentrated to crystallize the product. Thereafter, crystals were subjected to filtration under reduced pressure and vacuum-dried at 60° C. to obtain 0.96 g (yield: 96.0%) of the following product. The mass spec trum was measured, whereby m/z 618, and it was confirmed to be complex No. 7 represented by the following structure.

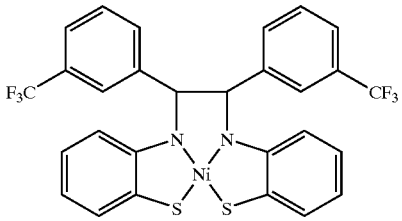

This complex showed intense absorption of ∈=22,000 at 835 nm in a near infrared region, in THF.

EXAMPLE 8

Preparation of an Infrared Absorption Filter Employing Complex No. 1

To 0.06 g of a 5 wt % THF solution of complex No. 1 obtained in Example 1, 1.5 g of a THF/toluene (=1/1) solution of a polymethyl methacrylate resin (DIANAL BR-80, tradename, product of Mitsubishi Rayon Co., Ltd.) was added and completely dissolved by an ultrasonic washing machine. Then, this coating solution was coated on an OHP film by a bar coater #24 and dried to obtain a near infrared absorption film. The coated film thickness was about 6 μm.

The near infrared absorption of this film was measured by Hitachi spectrophotometer U-3500, whereby λmax was 835 nm (FIG. 1).

On this film, an UV-screening filter (SC-39) manufactured by Fuji Photo Film Co., Ltd., was mounted, followed by irradiation for 400 hours by a xenon long life fade meter (FAL-25AX-HCB-EC) (product of Suga Test Instruments Co., Ltd.), whereby the absorption intensity before and after the irradiation at 835 nm, was measured, and the dye-remaining ratio (intensity before irradiation/intensity after irradiation×100) was 94.8%. Thus, high light resistance was confirmed.

Without mounting the UV-screening filter, irradiation by the above xenon long life fade meter was carried out for 80 hours and 400 hours, respectively, whereby the absorption intensity before and after the irradiation at 835 nm, was measured, whereby the dye-remaining ratio was 97.0% and 31.8%, respectively.

EXAMPLE 9

The light resistance was examined by carrying out the same operation as in Example 8 except that as an UV-screening filter, an UV-screening filter (ACRYPRENE) manufactured by Mitsubishi Rayon Co., Ltd. was used instead of SC39. Irradiation was carried out for 400 hours, and the absorption intensity before and after the irradiation at 835 nm, was measured, whereby the dye-remaining ratio was 94.2%. Thus, high light resistance was confirmed.

EXAMPLE 10

The light resistance was examined by carrying out the same operation as in Example 8 except that as an UV-screening filter, SC39 and ACRYPRENE were used as laminated, instead of SC39. Irradiation was carried out for 400 hours, and the absorption intensity before and after the irradiation at 835 nm, was measured, whereby the dye-remaining ratio was 94.5%. Thus, high light resistance was confirmed.

EXAMPLE 11

0.1 g of a 5.0% THF (tetrahydrofuran) solution of complex No. 1 synthesized in Example 1 and 3.5 g of a 14.3% solution (DME/dioxane=1/1 (volume ratio)) of a polycarbonate resin comprising the following structural unit:

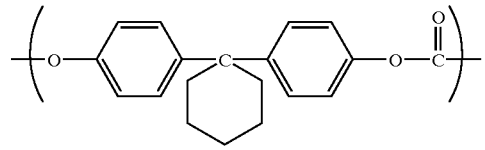

(viscosity average molecular weight (Mv)=40,000, glass transition point ($T_G$=182° C.), were mixed and dissolved, and the obtained solution was coated on a polyethylene terephthalate film (PET film "T100E" manufactured by Mitsubishi Chemical Polyester Film K.K., thickness: 100 μm) by a bar coater #24 and dried to obtain a near infrared absorption filter. The near infrared absorption of this film was measured by Hitachi spectrophotometer U-3500, whereby λmax was 846 nm.

Further, on this film, an UV-screening filter (ACRYPRENE) manufactured by Mitsubishi Rayon Co., Ltd. was overlaid, followed by irradiation for 280 hours by a xenon long life fade meter (FAL-25AX-HCB-EC) (product of Suga Test Instruments Co., Ltd.), whereby the absorption intensity before and after the irradiation at 846 nm, was measured, whereby the intensity after the irradiation was 90.9% of the intensity before the irradiation. Thus, high light resistance was confirmed.

EXAMPLE 12

The near infrared absorption filter of Example 11 was put in a constant temperature tank of 100° C. for 100 hours to carry out a heat resistance test, whereby the dye-remaining ratio (%) was measured by the absorbance of Hitachi spectrophotometer U-3500, and was found to be 96.6%, thus showing very good heat resistance.

EXAMPLE 13

Preparation of an Infrared Absorption Filter Employing Complex No. 2

To 0.06 g of 5 wt % THF solution of the complex dye obtained in Example 2, 1.5 g of a THF/toluene (=1/1) solution of a polymethyl methacrylate resin (DIANAL BR-80, tradename, product of Mitsubishi Rayon Co., Ltd.) (resin concentration: 20 wt %) was added and completely dissolved by an ultrasonic washing machine. Then, this coating solution was coated on an OHP film by a bar coater #24 and dried to obtain a near infrared absorption film. The coated film thickness was about 6 μm.

The near infrared absorption of this film was measured by Hitachi spectrophotometer U-3500, whereby λmax was 835 nm.

Further, on this film, an UV-screening filter (SC-39), manufactured by Fuji Photo Film Co., Ltd., was overlaid, followed by irradiation for 400 hours by a xenon long life fade meter (FAL-25AX-HCB-EC) (product of Suga Test Instruments Co., Ltd.), whereby the absorption intensity before and after the irradiation at 835 nm, was measured, and the dye-remaining ratio was 89.8%. Thus, high light resistance was confirmed.

EXAMPLE 14

The light resistance was examined by carrying out the same operation as in Example 13 except that as an UV-screening filter, ACRYPRENE was used instead of SC39. Irradiation was carried out for 400 hours, and the absorption intensity before and after the irradiation at 835 nm, was measured, whereby the dye-remaining ratio was 90.4%. Thus, high light resistance was confirmed.

EXAMPLE 15

The light resistance was examined by carrying out the same operation as in Example 13 except that as an UV-screening filter, SC39 and ACRYPRENE were used as laminated, instead of SC39. Irradiation was carried out for 400 hours, and the absorption intensity before and after the irradiation at 835 nm, was measured, whereby the dye-remaining ratio was 95.0%. Thus, high light resistance was confirmed.

EXAMPLE 16

Preparation of an Infrared Absorption Filter Employing Complex No. 3

To 0.06 g of a 5 wt % THF solution of complex No. 3 obtained in Example 3, 1.5 g of a THF/toluene (=1/1) solution of a polymethyl methacrylate resin (DIANAL BR-80, tradename, product of Mitsubishi Rayon Co., Ltd.) (resin concentration: 20 wt %) was added and completely dissolved by an ultrasonic washing machine. Then, this coating solution was coated on an OHP film by a bar coater #24 and dried to obtain a near infrared absorption film. The coated film thickness was about 6 μm.

The near infrared absorption of this film was measured by Hitachi spectrophotometer U-3500, whereby λmax was 835 nm).

Further, on this film, an UV-screening filter (SC-39), manufactured by Fuji Photo Film Co., Ltd., was overlaid, followed by irradiation for 400 hours by a xenon long life fade meter (FAL-25AX-HCB-EC) (product of Suga Test Instruments Co., Ltd.), whereby the absorption intensity before and after the irradiation at 835 nm, was measured, and the dye-remaining ratio was 93.1%. Thus, high light resistance was confirmed.

EXAMPLE 17

The light resistance was examined by carrying out the same operation as in Example 16 except that as an UV-screening filter, ACRYPRENE was used instead of SC39. Irradiation was carried out for 400 hours, and the absorption intensity before and after the irradiation at 835 nm, was measured, whereby the dye-remaining ratio was 91.5%. Thus, high light resistance was confirmed.

EXAMPLE 18

The light resistance was examined by carrying out the same operation as in Example 16 except that as an UV-screening filter, SC39 and ACRYPRENE were used as laminated, instead of SC39. Irradiation was carried out for 400 hours, and the absorption intensity before and after the irradiation at 835 nm, was measured, whereby the dye-remaining ratio was 95.4%. Thus, high light resistance was confirmed.

EXAMPLE 19

Preparation of an Infrared Absorption Filter Employing Complex No. 4

To 0.06 g of a 5 wt % THF solution of the complex dye obtained in Example 4, 1.5 g of a THF/toluene (=1/1) solution of a polymethyl methacrylate resin (DIANAL BR-80, tradename, product of Mitsubishi Rayon Co., Ltd.) (resin concentration: 20 wt %) was added and completely dissolved by an ultrasonic washing machine. Then, this coating solution was coated on an OHP film by a bar coater #24 and dried to obtain a near infrared absorption film. The coated film thickness was about 6 μm.

The near infrared absorption of this film was measured by Hitachi spectrophotometer U-3500, whereby λmax was 835 nm).

Further, on this film, an UV-screening filter (SC-39), manufactured by Fuji Photo Film Co., Ltd., was overlaid, followed by irradiation for 400 hours by a xenon long life fade meter (FAL-25AX-HCB-EC) (product of Suga Test Instruments Co., Ltd.), whereby the absorption intensity before and after the irradiation at 835 nm, was measured, and the dye-remaining ratio was 90.3%. Thus, high light resistance was confirmed.

EXAMPLE 20

The light resistance was examined by carrying out the same operation as in Example 19 except that as an UV-screening filter, ACRYPRENE was used instead of SC39. Irradiation was carried out for 400 hours, and the absorption intensity before and after the irradiation at 835 nm, was measured, whereby the dye-remaining ratio was 90.0%. Thus, high light resistance was confirmed.

EXAMPLE 21

The light resistance was examined by carrying out the same operation as in Example 19 except that as an UV-screening filter, SC39 and ACRYPRENE were used as laminated, instead of SC39. Irradiation was carried out for 400 hours, and the absorption intensity before and alter the irradiation at 835 nm, was measured, whereby the dye-remaining ratio was 92.0%. Thus, high light resistance was confirmed.

EXAMPLE 22

Preparation of an infrared absorption filter employing complex No. 5

To 0.06 g of a 5 wt % THF solution of complex No. 5 obtained in Example 5, 1.5 g of a THF/toluene (=1/1) solution of a polymethyl methacrylate resin (DIANAL BR-80, tradename, product of Mitsubishi Rayon Co., Ltd.) (resin concentration: 20 wt %) was added and completely dissolved by an ultrasonic washing machine. Then, this coating solution was coated on an OHP film by a bar coater #24 and dried to obtain a near infrared absorption film. The coated film thickness was about 6 μm.

The near infrared absorption of this film was measured by Hitachi spectrophotometer U-3500, whereby μmax was 845 nm).

This film was irradiated for 80 hours by a xenon long life fade meter (FAL-25AX-HCB-EC) (product of Suga Test Instruments Co., Ltd.), whereby the absorption intensity before and after the irradiation at 835 nm, was measured, and the dye-remaining ratio was 80.0%.

EXAMPLE 23

Preparation of a Filter for a Plasma Display Panel Employing Complex No. 1

To 0.8 part by weight of a 0.5 wt % methyl ethyl ketone solution of complex No. 1 obtained in Example 1, 1 part by weight of a methyl ethyl ketone/toluene (=1/1) solution of a polymethyl methacrylate resin (DIANAL BR-80, tradename, product of Mitsubishi Rayon Co., Ltd.) (20 wt % solution) and 0.2 part by weight of toluene, were added to obtain a coating solution, which was coated on a polyethylene terephthalate having a thickness of 50 μm, in a thickness of 2 μm. On the above film, a multilayer vapor deposition film of silver/indium tin oxide (ITO) having a surface resistivity of 5 Ω/□, was bonded.

Further, it was bonded to a polycarbonate plate having a thickness of 4 mm, and then, on each side, an anti-reflection agent made of a fluororesin was coated in a thickness of 100 nm to obtain a filter for a plasma display panel.

The obtained filter for a plasma display panel had a light transmittance of from 800 to 880 nm of at most 20%, and a visible light transmittance of at least 65%. Especially, the transmittance of from 400 to 500 nm was as high as at least 75%, and little yellowing was observed, whereby when it was installed in front of a display, it did not deteriorate the image quality and was good as a filter.

COMPARATIVE EXAMPLE 1

To about 20 ml of ethanol, 0.004 mol of KOH was dissolved, and to the solution, 10 ml of an ethanol solution containing 0.50 g (0.004 mol) of o-aminobenzenethiol, was added with stirring, to obtain a ligand solution.

On the other hand, to 10 ml of ethanol, 0.48 g (0.002 mol) of nickel (II) chloride hexahydrate was dissolved and dropwise added to the above ligand solution with stirring, whereby the solution changed to dark blue to dark green.

In this state, stirring was continued for about one hour. Then, a solution having 0.002 mol of tetrabutyl ammonium bromide dissolved in 10 ml of ethanol, was added, followed by stirring for further one hour.

Formed precipitate was collected by filtration, washed with ethanol and dried to obtain 0.61 g (yield: 56%) of tetrabutyl ammonium bis(aminobenzenethiol) nickelate represented by the following formula.

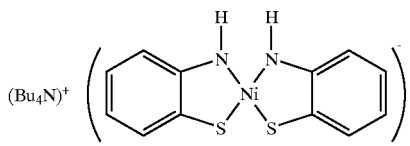

This complex showed absorption of ∈=24,000 at 807 nm, in a methanol solution.

The obtained dye was formed into a film in the same manner as in Example 1, whereby λmax was 824 nm.

Further, irradiation for 80 hours and 200 hours, respectively, was carried out by a xenon long life fade meter (FAL-25AX-HCB-EC) (product of Suga Test Instruments Co., Ltd.), and absorption intensity before and after the irradiation at 824 nm, was measured, and the dye-remaining ratio was 69.8% and 50.8%, respectively.

COMPARATIVE EXAMPLE 2

To 0.8 part by weight of a 1 wt % MEK/toluene (=1/1) solution of a phthalocyanine dye (IR-3, manufactured by Nippon Shokubai Co., Ltd.) known as a near infrared-absorbing dye, 1 part by weight of a MEK/toluene (=1/1) solution of a polymethyl methacrylate resin (DIANAL BR-80, tradename, product of Mitsubishi Rayon Co., Ltd.) (20 wt % solution), 0.1 part by weight of MEK and 0.1 part by weight of toluene were added to obtain a coating solution, which was coated in a thickness of 2 μm on a polyethylene terephthalate having a thickness of 50 μm.

In the same manner as in Example 23, on the above film, a silver/ITO multilayer vapor deposited film was bonded, followed by further bonding with a polycarbonate plate, and then on each side, an anti-reflection agent was coated to obtain a filter for a plasma display panel.

The obtained filter for a plasma display panel had a light transmittance of from 800 to 880 nm of at most 20%, but the visible light transmittance was at least 45%, and the transmittance of from 400 to 500 nm was at most 58%. Thus, when installed in front of a display, the image surface became dark, and, as such, it was not desirable as a filter.

COMPARATIVE EXAMPLE 3

In about 10 ml of ethanol, 0.53 g (0.005 mol) of benzaldehyde was dissolved, and to the solution, 0.53 ml (0.005 mol) of o-aminobenzenethiol was added at room temperature with stirring, followed by refluxing for 0.5 hour. To the solution, 20 ml of ethanol and 0.52 g (0.0021 mol) of Ni(AcO)$_2$.4H$_2$O were further added, whereupon a brown solid precipitated. After refluxing for further one hour, filtration under reduced pressure and washing with ethanol for a few times, were carried out. Then, the filtration product was vacuum-dried at 60° C. to obtain 1.03 g (0.0018 mol, yield: 85.7%) of a dark brown complex represented by the following formula.

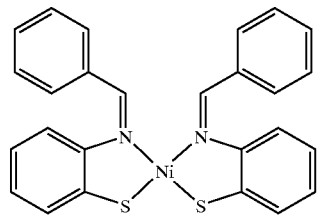

To 1.0 g of the above complex, 100 ml of THF was added, followed by refluxing until the reaction solution changed to a dark blue color. Thereafter, the filtration product was removed by filtration under reduced pressure, and then, the filtrate was concentrated to crystallize the product. Thereafter, crystals were subjected to filtration under reduced pressure and vacuum-dried at 60° C. to obtain 0.79 g (yield: 79.0%) of the following product. The mass spectrum was measured, whereby m/z. 482, and thus, it did not contradict with the following structure.

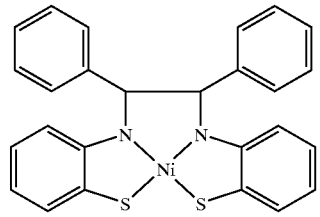

This complex showed intense absorption of ∈=34,000 at 830 nm in a near infrared region, in tetrahydrofuran.

To 0.06 g of a 5 wt % THF solution of this complex dye, 1.5 g of a THF/toluene (=1/1) solution of a polymethyl-methacrylate resin (DIANAL BR-80, tradename, product of Mitsubishi Rayon Co., Ltd.) (resin concentration: 20 wt %) was added and completely dissolved by an ultrasonic washing machine. Then, this coating solution was coated on an OHP film by a bar coater #24 and dried to obtain a near infrared absorption film. The coated film thickness was about 6 μm.

The near infrared absorption of this film was measured by Hitachi spectrophotometer U-3500, whereby λmax was 835 nm, but absorption was observed at 400 nm to 600 nm, showing an orange color, and the transmittance in a visible region was low (FIG. 1).

The results of evaluation of light resistance of Examples 8 to 11 and 13 to 23 and Comparative Example 1, are shown in the following Table 1.

TABLE 1

| Example No. | Dye-remaining ratio % (without UV filter) 80 hr | Dye-remaining ratio % (UV filter mounted) 400 hr | 400 hr (in the brackets, the filter is identified) |
|---|---|---|---|
| Ex. 9 | | | 94.2 (ACRYPRENE) |
| Ex. 10 | | | 94.5 (ACRYPRENE + SC39) |
| Ex. 11 | | | 90.9 (ACRYPRENE) |
| Ex. 13 | | | 89.8 (SC-39) |
| Ex. 14 | | | 90.4 (ACRYPRENE) |
| Ex. 15 | | | 95.0 (ACRYPRENE + SC39) |
| Ex. 16 | | | 93.1 (SC-39) |
| Ex. 17 | | | 91.5 (ACRYPRENE) |
| Ex. 18 | | | 95.4 (ACRYPRENE + SC39) |
| Ex. 19 | | | 90.3 (SC-39) |
| Ex. 20 | | | 90.0 (ACRYPRENE) |
| Ex. 21 | | | 92.0 (ACRYPRENE + SC39) |
| Ex. 22 | 80.0 | | |
| Comp. Ex. 1 | 69.8 | | |

According to the present invention, a metal complex dye showing intense absorption in a near infrared region is provided. This metal complex dye is soluble in an organic solvent, and can easily be processed into a film, for example. Further, an infrared absorption filter provided with an infrared-absorbing layer containing the metal complex dye of the present invention, can be made to be an infrared absorption filter excellent in the near infrared absorption performance, heat ray absorption performance, visible light transmittance and light resistance by virtue of the dye showing intense absorption in a near infrared region. Further, by providing an ultraviolet screening layer, the light resistance can remarkably be improved, and it is possible to realize a near infrared absorption filter which is practically excellent and which undergoes little deterioration by light or heat even when used for a long period of time.

The entire disclosures of Japanese Patent Application No. 11-202674 filed on Jul. 16, 1999 and Japanese Patent Application No. 11-218454 filed on Aug. 2, 1999 including specifications, claims, drawings and summaries are incorporated herein by reference in their entireties.

Having described the present invention, it will now be apparent that many changes and modifications may be made to the above-described embodiments without departing from the spirit and the scope of the present invention.

What is claimed is:
1. An organic metal complex represented by the following general formula (I):

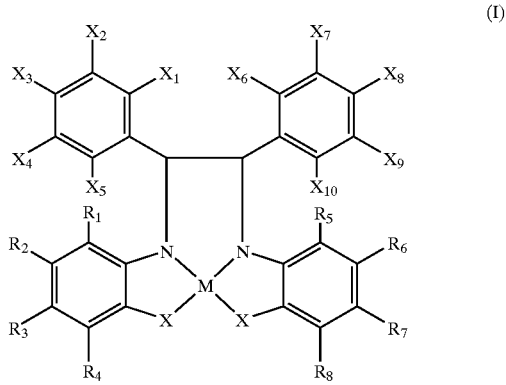

wherein:
X represents S or Se, M represents a metal element; $R_1$ to $R_8$ each independently represents hydrogen, alkyl which is optionally substituted, aryl which is optionally substituted, aralkyl which is optionally substituted, alkoxy which is optionally substituted, aryloxy, nitro, halogen, amino which is optionally substituted, or cyano; and $X_1$ to $X_{10}$ each independently represents hydrogen, halogen, hydroxyl, alkoxy, aryloxy, nitro, cyano, alkyl which is optionally substituted, aryl which is optionally substituted, or aralkyl which is optionally substituted; provided that at least one of $X_1$ to $X_{10}$ is not hydrogen.

2. The organic metal complex of claim 1, wherein in the formula (I), X is S.

3. The organic metal complex of claim 1, wherein in the formula (I), M is Ni, Pd, Pt, Co, Fe, Ti, Sn or Cu.

4. The organic metal complex of claim 1, wherein in the general formula (I), M is Ni.

5. The organic metal complex of claim 1, wherein in the formula (I), M is Ni, Pd, Pt or Co.

6. The organic metal complex of claim 1, wherein in the formula (I), X is S; and M is Ni.

7. The organic metal complex of claim 1, wherein each of $R_1$ to $R_8$ is hydrogen.

8. The organic metal complex of claim 1, wherein at least one of $X_1$ to $X_{10}$ is fluorine, chlorine, or cyano, and the remaining $X_1$ to $X_{10}$ groups are hydrogen.

9. The organic metal complex of claim 1, which is symmetrical with respect to formula (I).

10. The organic metal complex of claim 8, wherein from 1 to 3 of $X_1$ to $X_{10}$ is fluorine, chlorine or cyano; and the remaining $X_1$ to $X_{10}$ groups are hydrogen.

11. The organic metal complex of claim 9, wherein 2, 4, 6, 8 or 10 of $X_1$ to $X_{10}$ are fluorine; and $R_1$ to $R_8$ are hydrogen.

12. The organic metal complex of claim 9, wherein 2, 4, 6, 8 or 10 of $X_1$ to $X_{10}$ are chlorine; and $R_1$ to $R_8$ are hydrogen.

13. The organic metal complex of claim 9, wherein 2 or 4 of $X_1$ to $X_{10}$ are trifluoromethyl; and $R_1$ to $R_8$ are hydrogen.

14. The organic metal complex of claim 9, wherein 2 or 4 of $X_1$ to $X_{10}$ are cyano; and $R_1$ to $R_8$ are hydrogen.

15. The organic metal complex of claim 9, wherein 2 or 4 of $X_1$ to $X_{10}$ are nitro; and $R_1$ to $R_8$ are hydrogen.

16. The organic metal complex of claim 9, wherein 2 of $X_1$ to $X_{10}$ are bromine; and $R_1$ to $R_8$ are hydrogen.

17. The organic metal complex of claim 9, wherein 2 of $X_1$ to $X_{10}$ are hydroxy; and $R_1$ to $R_8$ are hydrogen.

18. An infrared-absorbing dye, comprising the organic metal complex of claim 1.

19. An infrared absorption filter, comprising the organic metal complex of claim 1.

20. The infrared absorption filter of claim 19, having a near infrared transmittance in a wavelength range 800–1,100 nm of at most 15%.

21. The infrared absorption filter of claim 19, having an ultraviolet screening layer laminated thereon.

22. The infrared absorption filter of claim 19, further comprising another near infrared absorbing compound.

23. A filter for a plasma display panel, comprising the infrared absorption filter of claim 19.

24. The filter for a plasma display panel of claim 23, having an electromagnetic wave screening layer laminated thereon.

25. The filter for a plasma display panel of claim 23, having an anti-reflection layer laminated thereon.

26. The filter for a plasma display panel of claim 23, having an anti-glare (non-glare) layer laminated thereon.

27. The filter for a plasma display panel of claim 23, having an ultraviolet screening layer laminated thereon.

28. A method for absorbing near infrared radiation, which comprises subjecting the organic metal complex of claim 1 to near infrared radiation, thereby absorbing said radiation.

* * * * *